US010611561B2

(12) United States Patent
Bongiovanni

(10) Patent No.: US 10,611,561 B2
(45) Date of Patent: Apr. 7, 2020

(54) SELF-SEALING LIQUID CONTAINMENT SYSTEM WITH AN INTERNAL ENERGY ABSORBING MEMBER

(71) Applicant: Hutchinson, S.A., Paris (FR)

(72) Inventor: David L. Bongiovanni, Grand Island, NY (US)

(73) Assignee: Hutchinson Industries, Inc., Trenton, NJ (US)

( * ) Notice: Subject to any disclaimer, the term of this patent is extended or adjusted under 35 U.S.C. 154(b) by 380 days.

(21) Appl. No.: 13/852,236

(22) Filed: Mar. 28, 2013

(65) Prior Publication Data
US 2013/0256315 A1 Oct. 3, 2013

Related U.S. Application Data

(60) Provisional application No. 61/619,483, filed on Apr. 3, 2012.

(51) Int. Cl.
B65D 90/22 (2006.01)
B60K 15/03 (2006.01)
(Continued)

(52) U.S. Cl.
CPC .............. B65D 90/22 (2013.01); B60K 15/03 (2013.01); F41H 5/0421 (2013.01);
(Continued)

(58) Field of Classification Search
CPC . B65D 90/22; B65D 90/52; F17C 3/00; F17C 3/06; F17C 13/00; B60K 15/03;
(Continued)

(56) References Cited

U.S. PATENT DOCUMENTS 3,698,587 A * 10/1972 Baker et al. ............... 428/63
4,613,535 A    9/1986 Harpell et al.
(Continued)

FOREIGN PATENT DOCUMENTS

| GB | 2054457 | 2/1981 |
| WO | WO2006076030 | 7/2006 |
| WO | WO2008098771 | 8/2008 |

OTHER PUBLICATIONS

International Search Report and Written Opinion for corresponding International Application No. PCT/US2013/34319, dated Jun. 5, 2013.
International Preliminary Report on Patentability and Written Opinion for corresponding International Application No. PCT/US2013/34319, dated Oct. 7, 2014.
European Search Report dated Oct. 28, 2015 for corresponding European Application No. 13771901.9.

Primary Examiner — James N Smalley
Assistant Examiner — Madison L Poos
(74) Attorney, Agent, or Firm — K&L Gates LP

(57) ABSTRACT

A system. The system includes a liquid container and an energy absorbing system positioned. The liquid container includes a wall which defines an interior volume of the liquid container. The energy absorbing system is within an interior volume of the liquid container. The energy absorbing system is configured such that if an object passes through the wall of the liquid container and impacts the energy absorbing system, an amount of energy absorbed by the energy absorbing system is at least 18% greater than an amount of energy absorbed by the wall of the liquid container. The energy absorbing system includes one or more energy absorbing members, wherein at least one of the one or more energy absorbing members comprises a metal and has a Brinell hardness of at least 150.

20 Claims, 3 Drawing Sheets

(51) Int. Cl.
*F41H 5/04* (2006.01)
*F41H 7/04* (2006.01)

(52) U.S. Cl.
CPC ............. *F41H 5/0457* (2013.01); *F41H 7/04* (2013.01); *B60K 2015/03039* (2013.01); *B60K 2015/03046* (2013.01); *B60K 2015/03407* (2013.01); *B65D 2590/245* (2013.01)

(58) Field of Classification Search
CPC ........... B60K 2015/03046; B60K 2015/03407; B60K 2015/03039
USPC .... 220/4.14, 560.01, 560.02, 562, 563, 564, 220/565, 567.2, 720; 428/911, 912
See application file for complete search history.

(56) References Cited

U.S. PATENT DOCUMENTS

| | | | |
|---|---|---|---|
| 5,421,479 A | | 6/1995 | Noorafshani |
| 7,393,572 B1 | | 7/2008 | Monk et al. |
| 8,091,464 B1 | * | 1/2012 | Imholt et al. ................. 89/36.02 |
| 8,176,829 B1 | * | 5/2012 | Carberry et al. ............ 89/36.02 |
| 2009/0050629 A1 | | 2/2009 | Ohnstad et al. |
| 2010/0045017 A1 | * | 2/2010 | Rea ............................... 280/830 |
| 2010/0170021 A1 | | 7/2010 | Van Es et al. |
| 2010/0282062 A1 | * | 11/2010 | Sane et al. ................... 89/36.02 |
| 2011/0253726 A1 | * | 10/2011 | Monk et al. ............. 220/560.02 |
| 2012/0055937 A1 | * | 3/2012 | Monk et al. ............. 220/560.02 |

\* cited by examiner

SELF-SEALING LIQUID CONTAINMENT SYSTEM WITH AN INTERNAL ENERGY ABSORBING MEMBER

CROSS-REFERENCE TO RELATED APPLICATION

This application claims the benefit under 35 U.S.C. § 119(e) of the earlier filing date of U.S. Provisional Patent Application No. 61/619,483 filed on Apr. 3, 2012.

BACKGROUND

This application discloses an indention which is related, generally and in various embodiments, to a self-scaling liquid containment system with one or more internal energy absorbing members.

There are a variety of liquid containers currently in use which hold fuels (gasoline, jet fuel, kerosene, oil, diesel, etc.) or other fluid (water, alcohol, solvent, lubricant, etc.). Depending on the liquid which the containers are to hold, the containers may be fabricated from plastic, aluminum, steel etc. For containers which are to bold fuel, such containers include, for example, free-standing fuel storage tanks, fuel tanks of vehicles, fuel transport vehicles, etc. In general, many of such had containers are constructed from metals (e.g., steel, aluminum, etc.) having nominal thicknesses and no special protection horn a high impact event and/or a high energy ballistic event. A simplified representation of a liquid container capable of holding fuel is shown in FIG. 1.

In many situations, especially in military-related situations, a breach or opening created through the wall of a standard fuel container such as, for example, a fuel tank, of a vehicle, can have disastrous consequences. Such consequences can range from the loss of valuable fuel to the ignition of the fuel and the explosion of the container/vehicle. In the case of a standard fuel container if the standard fuel container is subjected to a high impact event and/or a high energy ballistic event, it is not uncommon for the event to cause a breach or opening through a wall of the fuel container. The breach or opening leads to the rapid loss of fuel and possibly the ignition of the fuel and the explosion of the container/vehicle. Obviously, the breach or opening can pose a serious risk to the lives of people in the vicinity of the fuel container.

Various approaches have been utilized to reduce the risk of the negative consequences associated with a breach or opening through a liquid containers wall. Such approaches include, for example, spraying a protective coating over the exterior surface of the liquid container, surrounding the liquid container with ballistic plates, surrounding the liquid container with self-sealing panels and self-sealing cap members, etc.

For a given liquid container, although the above-described approaches have varying levels of success regarding the prevention and/or self-sealing of "entrance penetration wounds" to a wall of the liquid container, the respective approaches are often less successful regarding the prevention and/or self-sealing of "exit penetration wounds" to one or more walls of the liquid container.

In general, an entrance penetration wound to a wall of a given liquid container results in minimal deflection of the wall. When a projectile impacts the wall of the liquid container, the relatively low compressibility of the fluid within the liquid container operates to limit the "inward" deflection of the wall. As the projectile passes through the wall, any petalling resulting from the entrance penetration is typically directed into the liquid container and away from an external self-sealing coating. Thus, the breach or opening through the wall tends to be "clean" allowing any external protection (e.g., a self-sealing coating) to provide adequate reduction or elimination at fluid leakage.

In contrast to its performance regarding entrance wounds, it is significantly more difficult for an external self-sealing coating to rapidly provide a reduction in fluid leakage or completely seal m exit wound. When a projectile which has passed through a given wall of a liquid container and into the interior of the liquid container subsequently impacts another wall of the liquid container (or the given wall at a different location), the resulting "outward" deflection of the impacted wall is generally more severe than the previous "inward" deflection of the given wall.

There are multiple factors which can cause the "outward" deflection to be more severe than the associated "inward" deflection. For example, although the fluid within the liquid container operates to limit the "inward" deflection of the wall it does not operate to limit the "outward" deflection of the wall. Also, when the projectile impacts the fluid within the liquid container, a pressure wave is developed which travels through the fluid, and the traveling pressure wave operates to exert additional forces (e.g., hydro-dynamic ram) against the wall which can contribute to greater resultant damage at the exit wound. Additionally, projectile dynamics can also contribute to greater resultant damage at the exit wound. Non-spherical and ogive-shaped projectiles are very unstable as they travel through fluid. Due to this instability, these projectiles often impact tank walls in a tumbled or off-axis condition. When a projectile in a tumbled or oil-axis condition penetrates a given wall of the liquid container, the resulting opening in the wall tends to be in the shape of a large oblong hole.

Petalling resulting from the exit penetration is typically directed away from the liquid container and toward an external self-sealing coating. Cracking of the wall may also occur at the exit wound. The combination of deflection, petalling and cracking all create a wound that is significantly larger and therefore more difficult to rapidly and completely seal than a typical entrance wound.

One approach to reducing die size of a potential exit wound has been to increase the thickness of the wall of the liquid container to absorb/dissipate greater amounts of energy upon, projectile impact. The energy required for a projectile to penetrate a wall of the liquid container is proportional to the thickness of the wall. By increasing the thickness of the wall, the amount of energy introduced into the liquid container by tire projectile is reduced, and the amount of energy subsequently applied to the exit wound is reduced. However, increased wall thickness alone is undesirable as it adds weight and reduces the volumetric capacity of the liquid container (for the same overall size).

Some liquid containers include interior features, which although not specifically designed to eliminate or reduce exit penetrations by increased energy absorption, do operate to potentially limit the amount of energy applied to an exit wound. Such interior features include, for example, a slosh baffle, a chamber baffle, a diaphragm, a bladder, etc.

Regarding internal slosh baffles, one or more slosh baffles have been mounted strategically within a fuel tank to mitigate fluid oscillation due to slosh, and generally have been positioned within the fuel tank to handle areas of excess shad motion. Slosh baffles are typically fabricated irons a material which is the same as or similar to the wall of the fuel tank. While such slosh baffles will absorb/dissipate some of the energy from a projectile passing through them, they are not constructed with the sufficient thickness, hardness, toughness, etc, to have the capability to absorb/dissipate enough of the projectile's energy to meaningfully reduce the projectile's ability to create a damaging exit penetration wound.

Regarding internal chamber baffles, one or more chamber baffles nave been mounted strategically within a fuel tank to create separated chambers within the fuel tank. The positioning of the chamber baffles have varied from application to application based on the chamber separation requirements. Chamber baffles are typically fabricated from a material which is the same as or similar to the wall of the fuel tank. While such chamber baffles will absorb/dissipate some of the energy from a projectile passing through them, they are not constructed with the sufficient thickness, hardness, toughness, etc. to have the capability to absorb/dissipate enough of the projectile's energy to meaningfully reduce the projectile's ability to create a damaging exit penetration wound.

Regarding interior diaphragms, one or more diaphragms have been positioned strategically within a feel tank to control internal pressures in individual chambers within the fuel tank. The diaphragms are typically fabricated from a compliant material. While such diaphragms will absorb/dissipate some of the energy from a projectile passing through them, they are not constructed with the sufficient thickness, hardness, toughness, etc, to have the capability to absorb/dissipate enough of the projectile's energy to meaningfully reduce the projectile's ability to create a damaging exit penetration wound.

Regarding inferior bladders, one or more bladders have been positioned within a liquid container and operate to contain, a liquid or fluid. The bladders are typically fabricated from a compliant material. While such bladders will absorb/dissipate some of the energy from a projectile passing through them, they are not constructed with the sufficient thickness, hardness, toughness, etc. to have the capability to absorb/dissipate enough of the projectile's energy to meaningfully reduce the projectile's ability to create a damaging exit penetration wound.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
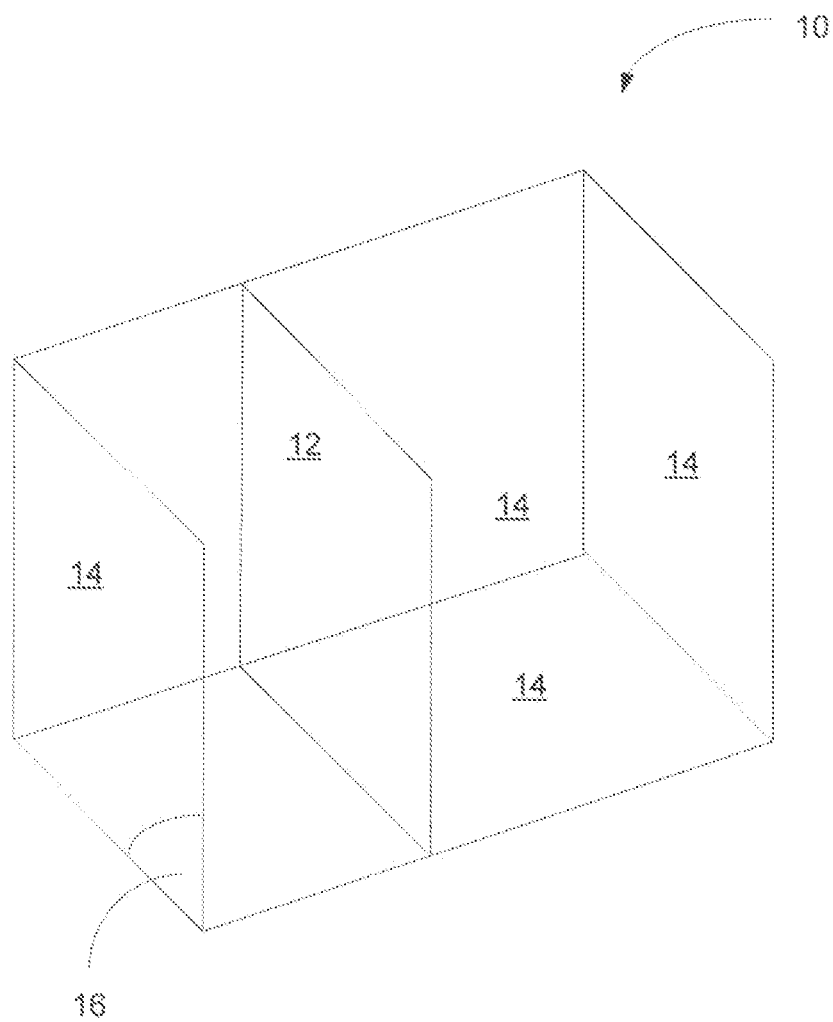
FIG. 1 illustrates various embodiments of a liquid container having an internal energy absorbing system.

FIG. 1 illustrates various embodiments of a liquid container 10 having an internal energy absorbing system 12. To allow for an unobstructed view of the energy absorbing system 12, some "exterior" portions of the liquid container 10 are not shown in FIG. 1. The liquid container 10 may hold a liquid within the liquid container 10, and the held liquid may be a fuel (e.g., gasoline, jet fuel, kerosene, oil, diesel, etc.) or other fluid (water, alcohol, solvent, lubricant, etc.). The liquid container 10 may also form a portion of a larger apparatus such as a vehicle, an airplane, etc. For purposes of simplicity, the liquid container 10 will be described in the context of being embodied as a fuel tank of a vehicle. However, it will be appreciated that the liquid container 10 can be a liquid container other than a fuel tank. Additionally, although the liquid container 10 is shown as essentially rectangular shaped in FIG. 1, it will be appreciated that the liquid container 10 may be of any suitable size and shape.

As shown in FIG. 1, the fuel lank 10 includes a wall 14 which defines an interior volume of the reel tank 10. Portions of the wall 14 are not shown in FIG. 1 in order to allow an unobstructed view of the energy absorbing member. The wall 14 may be fabricated from any suitable material and may be fabricated from any number of individual pieces (e.g., one piece, multiple pieces, etc.). For example, according to various embodiments, the wall 14 may include a plastic, an aluminum, a steel, an alloy, etc. The ability of the wall 14 to absorb/dissipate impact energy can vary depending on the material the wall 14 is fabricated from and the hardness of the material (which is related to the thickness of the material).

According to various embodiments, the "exterior" of the wall 14 is covered by a self-sealing material 16 such as, for example, a self-sealing spray coating, self-sealing panels, self sealing cap members, etc. For purposes of clarity, only a very small portion of the self-sealing material 16 is shown covering the "exterior" of the wall 14 in the lower left-hand side of FIG. 1. For embodiments where the wall 14 is substantially covered by the self-sealing material 16, it will be appreciated that the liquid container 10 may function, as a self-scaling fuel containment system which automatically prevents fuel from escaping to the atmosphere when a high impact event and/or a high energy ballistic event causes a breach or opening to occur through a given wall 14 of the fuel tank 10 (e.g., causes an entrance penetration wound). Such breaches or openings may occur, for example, when an object such as a projectile, shrapnel, etc. traveling at a high speed passes through a wall 14 of the fuel tank 10 and into the interior of the fuel tank 10. Although the liquid container 10 has been described in the context of having a single wall 14 which defines the interior volume of the liquid container 10, it will be appreciated that the liquid container 10 may be fabricated to include arm number of wall 14 which collectively define the interior volume of the liquid container 10.

As shown in FIG. 1, the energy absorbing system 12 is positioned within the interior volume of the fuel tank 10. According to various embodiments, the energy absorbing system 12 is connected to the liquid container 10. The energy absorbing system 12 may be connected to the liquid container 10 in any suitable manner. For example, according to various embodiments, the energy absorbing system 12 may be welded to the liquid container 10, fastened to the liquid container 10 via fasteners, screws, bolts, clips, etc. According to other embodiments, the energy absorbing system 12 may be in a floating or loose attachment arrangement with the liquid container 10 via non-fastened brackets, bushings, flexible bellows, etc.

Figure 2:
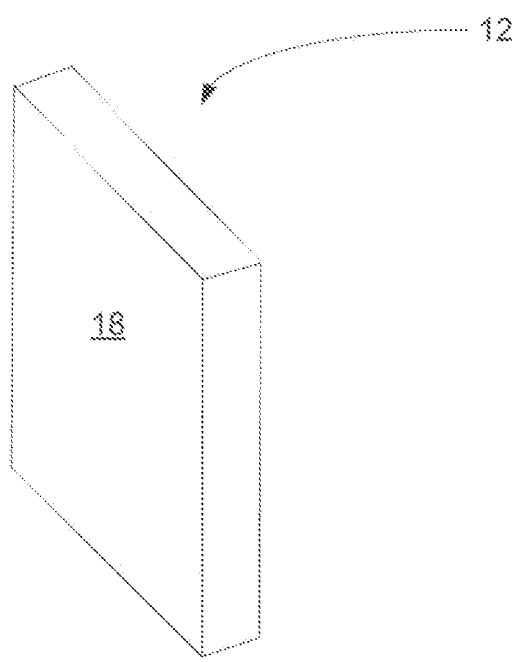
FIG. 2 illustrates various embodiments of the energy absorbing system of FIG. 1.

FIG. 2 illustrates various embodiments of the energy absorbing system 12. The energy absorbing system 12 includes one or more energy absorbing members 18 and is configured such that the amount of impact, energy able to be absorbed/dissipated by the energy absorbing system 12 is at least 18% greater than die amount of impact energy able to be absorbed/dissipated by the wall 14 of the fuel tank 10. For embodiments where the energy absorbing system 12 includes more than one energy absorbing member 18, it will be appreciated that the summation of the energies able to be absorbed/dissipated by the respective energy absorbing members 18 is at least 18% greater than the amount of impact energy able to be absorbed/dissipated by the wall 14 of the fuel tank 10. A given energy absorbing member 18 may be fabricated than any suitable material (e.g., a metal, an alloy, a non-metal etc.) or combination of materials, and may be configured in any suitable size, shape arm thickness. For example, according to various embodiments, a given energy absorbing member 18 includes a metal and has a Brinell hardness of at least 150 (or an equivalent Rockwell hardness, Vickers hardness, Knoop hardness, Shore hardness, etc.).

Although only one energy absorbing member 18 is shown in the energy absorbing system 12 FIG. 2, it will be appreciated that according to other embodiments, the energy absorbing system 12 may include a plurality of energy absorbing members 18. For such embodiments, the energy absorbing members 18 may be connected to one another, spaced apart from one another, or combinations thereof. The respective energy absorbing members 18 may be positioned within the liquid container 10 in areas that provide for maximum protection for high risk penetration directions. For example, in many instances, threats are directed against the "bottom" or "back sides" of a fuel tank 10. By strategically placing one or more energy absorbing members 18 within the fuel tank 10 to optimize their effectiveness, the likelihood and/or severity of any projectile related exit wounds are significantly reduced.

In general, the material(s), size and shape of a given energy absorbing member 18 will be based upon various factors such as the threat level space requirements, fuel type, etc. For example, according to various embodiments, a given energy absorbing member 18 includes a metal (e.g., a 7075 T6 aluminum having a Brinell hardness of 150). According to other embodiments, a given energy absorbing member 18 may include a non-metal such as, for example, a plastic, a composite material, a ceramic material, combinations thereof, etc.

Figure 3:
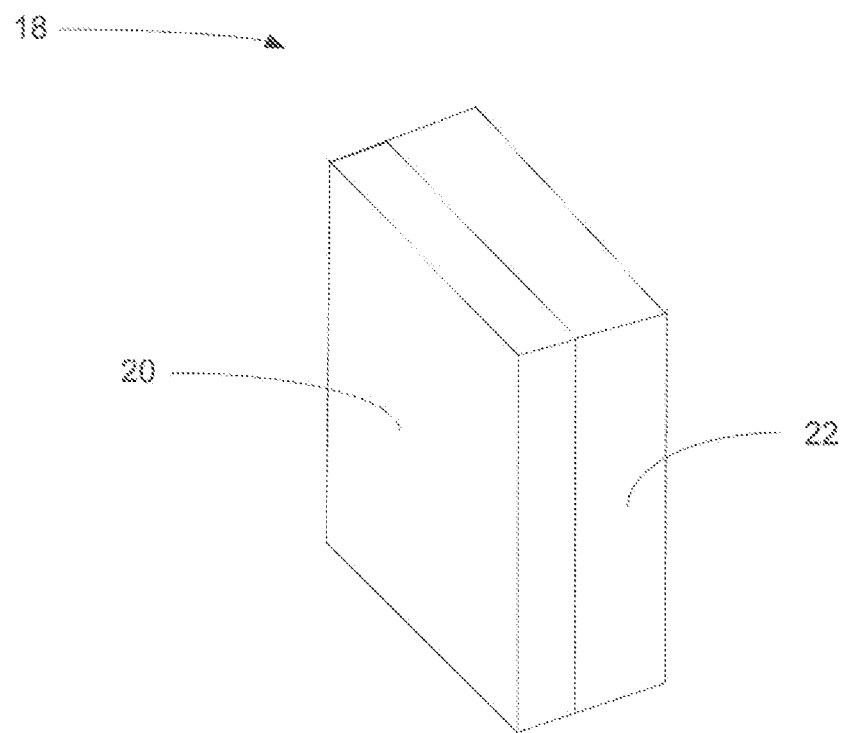
FIG. 3 illustrates various embodiments of an energy absorbing member of the energy absorbing system of FIG. 1.

FIG. 3 illustrates various embodiments of a given energy absorbing member 18 of the energy absorbing system 12. As shown in FIG. 2, the energy absorbing member 18 is configured as a "laminate" which includes a first layer 20 of a first material and a second layer 22 of a second material, where the first and second materials may be any suitable materials (e.g., a metal, a plastic, a composite material, a ceramic material, etc.). The first material may be the same as or different than the second material. Similarly, the size, shape and/or thickness of the first layer 20 may be the same as or different than the size, shape and/or thickness of the second layer 22. Although only two layers 20, 22 are shown in FIG. 3, it will be appreciated that a given energy absorbing member 18 may include any number of layers lubricated boot any suitable types of materials.

The amount of impact energy to be respectively absorbed/dissipated by the wall 14 and the energy absorbing system 12 can be quantified for different materials and configurations. For example, for instances where a given energy absorbing member 18 includes a metal, the amount of energy to be absorbed/dissipated by the given energy absorbing member 18 can be quantified by using the following residual velocity equation to determine the deceleration of the object (e.g., projectile, shrapnel, etc.) as it passes through the energy absorbing member 18, then converting the determined residual velocity to energy using a standard energy loss formula:

$$v_r = \left\{ v^2 - \left[ \frac{1.1275 \left(\frac{t}{D}\right)^{0.8} D^{1.5} \log_{10} BHN}{m^{0.5} \cos^{0.8}\theta} \right]^2 \right\}^{0.5} \quad (1)$$

where $v_r$ is the residual velocity of the object, v is the impact velocity of die object, t is the thickness of the energy absorbing member 18, D is the diameter of the object, BHN is the Brinell Hardness Number associated with the energy absorbing member 18, m is the mass of the object and θ is the angle of obliquity.

According to various embodiments, the configuration of a given energy absorbing member 18 causes fragmentation of the projectile (the breaking up of the large high energy projectile into multiple smaller lower energy projectiles) after the projectile impacts the energy absorbing member 18. For such embodiments, the energy absorbing member 18 includes a material having a higher hardness than the material which the projectile is fabricated from. When the projectile impacts the energy absorbing member 18, large amounts of energy will be transferred into projectile deformation. If enough energy is transferred into projectile deformation, the projectile will break into multiple pieces. The breaking of the projectile into smaller objects causes the energy absorbing member 18 to absorb large amounts of energy. The reduced cross-sectional area and energy of the respective fragments results in a reduction of the size of the exit wound or the elimination of exit penetrations. This can allow for an overall reduction in the self-sealing material 16 on the exterior of the liquid container 10 and facilitate a reduction in the amount of fuel leakage from the liquid container 10.

In general, when a projectile traveling at a high speed initially passes through a given wall 14 of the fuel tank 10, into the interior of the fuel tank 10 and impacts an energy absorbing member 18, the energy absorbing member 18 functions to absorb/dissipate energy from the projectile, thereby reducing or eliminating the projectile's ability to produce an exit wound through another wall 14 of the fuel tank 10 (or through the given wall 14 at a different location). Even if the projectile passes through the energy absorbing member 18 and produces an exit wound at the another wait 14 (or at the given wall 14 at a different location), there will be less damage to the wall 14 of the fuel tank 10. With less damage, it is more likely that the self-sealing material covering the liquid container 10 will be able to rapidly and completely seal the exit wound, thereby reducing the amount of lost fuel.

The energy absorbing member 18 is configured to allow reel within the liquid container 10 to flow with hunted restriction from one side of the energy absorbing member 18 to an opposite side of the energy absorbing member 18 to prevent sloshing. Stated differently, the energy absorbing member 18 does not cause fuel to be trapped in any area of the liquid container 10. According to various embodiments, the energy absorbing member 18 can be configured and arranged within, the liquid container 10 to absorb energy developed by hydrodynamic ram. The shape, cross sectional area, thickness and location of an energy absorbing member 18 within a fuel tank 10 all can contribute to the suppression of energy developed by hydrodynamic ram. The resulting deformation of the energy absorbing member 18 as well as any translation induced into floating managements will operate reduce the amount of energy applied to the wall 14 of the liquid container 10. The reduction in the amount of energy applied to the wall 14 of the liquid container 10 will result in less petalling, cracking and deflection developed in any projectile related exit wounds.

The use of one or more light weight energy absorbing members 18 within the liquid container 10 can allow for a reduction in the amount of self-sealing material 16 needed on the exterior of the liquid container 10. The reduction can be a uniform reduction, or a reduction over certain areas of the liquid container 10. Depending on the amount of the reduction, the overall weight of the fuel system can be lowered. The use of one or more light weight energy absorbing members 18 within the liquid container 10 can also allow for a reduction in the thickness of the wall 14 of the liquid container 10, thereby reducing the weight of the fuel system and/or increasing the volume of fuel that can be held by the liquid container 10. The use of one or more light weight energy absorbing members 18 within the liquid container 10 can also allow for the wad 14 to be lubricated from a lighter material than would otherwise be the ease, thereby reducing the weight of the fuel system. For example, a fuel tank 10 having a wall 14 (or walls) fabricated from high density polyethylene (HDPE) and utilising one or more energy absorbing members 18 can provide the same level of ballistic protection as a steel fuel tank having no internal energy absorbing members 18.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the claimed invention.

Although the invention has been described in terms of particular embodiments in this application, one of ordinary skill in the art, in light of the teachings herein, can generate additional embodiments and modifications without departing from the spirit of or exceeding the scope of the claimed invention. Accordingly, it is understood that the drawings and the descriptions herein are proffered only to facilitate comprehension of the invention and should not be construed to limit the scope thereof.

What is claimed is:

1. A system, comprising:
   a liquid container configured to hold a liquid within an interior volume of the liquid container, wherein the liquid container comprises a wall which defines the interior volume of the liquid container; and
   an energy absorbing system positioned within the interior volume of the liquid container, wherein:
      the energy absorbing system is configured such that if an object passes through the wall of the liquid container and impacts the energy absorbing system, an amount of energy absorbed by the energy absorbing system is at least 18% greater than an amount of energy absorbed by the wall of the liquid container; and
      the energy absorbing system comprises one or more energy absorbing members, wherein at least one of the one or more energy absorbing members comprises a metal and has a Brinell hardness of at least 150, and wherein the at least one of the one or more energy absorbing members is configured to allow the liquid to flow freely within the liquid container from one side of the energy absorbing member to an opposite side of the energy absorbing member.

2. The system of claim 1, wherein the wall of the liquid container comprises a metal.

3. The system of claim 1, wherein the wall of the liquid container comprises a plastic material.

4. The system of claim 3, wherein the wall of the liquid container comprises a high density polyethylene.

5. The system of claim 1, wherein the wall of the liquid container is covered by a self-sealing material.

6. The system of claim 1, wherein the at least one of the one or more energy absorbing members comprises an aluminum.

7. The system of claim 1, wherein the at least one of the one or more energy absorbing members comprises a laminate, wherein the laminate comprises a first layer of a first material and a second layer of a second material.

8. The system of claim 7, wherein the first material is different from the second material.

9. The system of claim 1, wherein the at least one of the one or more energy absorbing members is connected to the liquid container.

10. A system, comprising:
    a liquid container configured to hold a liquid within an interior volume of the liquid container, wherein the liquid container comprises a wall which defines the interior volume of the liquid container; and
    an energy absorbing system positioned within the interior volume of the liquid container, wherein:
       the energy absorbing system is configured such that if an object passes through the wall of the liquid container and impacts the energy absorbing system, an amount of energy absorbed by the energy absorbing system is at least 18% greater than an amount of energy absorbed by the wall of the liquid container; and
       the energy absorbing system comprises one or more energy absorbing members, wherein at least one of the one or more energy absorbing members comprises a non-metal, and wherein the at least one of the one or more energy absorbing members is configured to allow the liquid to flow freely within the liquid container from one side of the energy absorbing member to an opposite side of the energy absorbing member.

11. The system of claim 10, wherein the wall of the liquid container comprises a metal.

12. The system of claim 10, wherein the wall of the liquid container comprises a plastic material.

13. The system of claim 12, wherein the wall of the liquid container comprises a high density polyethylene.

14. The system of claim 10, wherein the wall of the liquid container is covered by a self-sealing material.

15. The system of claim 10, wherein the at least one of the one or more energy absorbing members comprises a plastic material.

16. The system of claim 10, wherein the at least one of the one or more energy absorbing members comprises a composite material.

17. The system of claim 10, wherein the at least one of the one or more energy absorbing members comprises a ceramic material.

18. The system of claim 10, wherein the at least one of the one or more energy absorbing members comprises a laminate, wherein the laminate comprises a first layer of a first material and a second layer of a second material.

19. The system of claim 18, wherein the first material is different from the second material.

20. The system of claim 10, wherein the at least one of the one or more energy absorbing members is connected to the liquid container.

* * * * *